Patented Sept. 15, 1936

2,054,112

UNITED STATES PATENT OFFICE 2,054,112

SHEET OR FILM FORMING, OR COATING COMPOSITION AND A METHOD OF PREPARING THE SAME

Allen Abrams and Charley L. Wagner, Wausau, Wis., assignors to Marathon Paper Mills Company, Rothschild, Wis., a corporation of Wisconsin No Drawing. Application October 16, 1933, Serial No. 693,740

22 Claims. (Cl. 106—23)

This invention relates to a sheet or film forming, or coating composition and to a method of preparing the same.

It has heretofore been suggested, in connection with the impregnation of fabric and leather materials, to use mixtures of various substances, including rubber, with paraffin wax or other waxy material. In general, the objective has been to secure a solution of rubber or related materials in a wax that will have a relatively low viscosity and therefore good penetrating properties. For this purpose, it has been suggested to use volatile solvents or thinners and also to dissolve rubber directly in paraffin wax and to heat the solution to a sufficiently high temperature or otherwise treat the solution to greatly lower its viscosity.

Such prior practices are unsuited for the purposes of the present invention, which has for its object the provision of a sheet or film forming, or coating composition rather than an impregnating compostion. We have found that in order for a solution of rubber in wax to have the desired properties for these uses, it is important that the solution have a relatively high viscosity. A property most desired in the composition of our invention is that the composition, when applied to paper or similar web or sheet material, does not "strike through" but remains merely as a surface coating. Such coating, for our purposes, should be tough, flexible and thermoplastic and/or adhesive, and should impart moisture-proofness, water-proofness and gas-proofness to the paper or other base.

Our composition, furthermore, has the remarkable property of being heat-sealing at high temperatures, while being non-tacky at room temperatures. When our composition is made into sheets or films, or applied as a coating, it may be heat-sealed against itself or to another sheet or film, such as paper, metal foil, or the like, by means of heat and pressure, and without the composition striking through the base lamination of paper or the like. In addition to these desirable properties, the tensile strength of our product is very materially greater than that of pure paraffin. Because of its greater cohesive and tensile strength our new composition may be made into transparent sheet or film material without any fabric or fibrous base, if desired.

Furthermore, pigments may be satisfactorily incorporated into our composition by first incorporating the pigments in the rubber and then dissolving the pigmented rubber in the wax.

It is, then, an object of this invention to prepare a composition from rubber, rubber-like substances and wax or wax-like substances, which is solid and non-tacky at room temperature and heat sealing at high temperature, and which is well adapted for use in the formation of sheets or films or as a coating for web or sheet material, for adhesive purposes and the like.

It is a further object of this invention to prepare a solid, non-tacky, tasteless, odorless and cheap paraffin wax rubber composition, which is adapted to provide a tough, flexible, thermoplastic coating and/or adhesive for paper or other web or sheet material and which will impart moisture-proofness, water-proofness and gas-proofness to the base material to which it is applied.

It is a further object of this invention to prepare a paraffin wax-rubber composition adapted for use in forming heat-sealing coatings and which will not substantially impregnate or strike through the paper or other sheet or web material during the process.

It is a further object of this invention to provide a suitable process for producing our composition.

Another object of this invention is to provide flexible, self-sustaining sheets or films from our rubber-wax compositions.

Other and further objects of this invention will be evident from the following specification and the accompanying claims.

The composition of our invention comprises a solution of rubber, or a rubber-like substance, in a wax, or a wax-like substance. Among the suitable rubber and rubber-like substances may be mentioned:

Pale crepe rubber
Smoked sheet rubber
Gutta percha and among the suitable waxes and wax-like substances:

Paraffin wax
Bleached beeswax
Spermaceti

Since solutions of rubber and wax have widely varying viscosities, depending upon the proportions and particular ingredients used and upon the conditions of preparation, we have found it of assistance first to determine the limits of viscosity within which the solutions show satisfactory results for coating and sheet or film forming purposes, or as an adhesive in making laminated sheets. In general, a solution to be suitable for these purposes should have a viscosity of not less than 8000 secs. (50 c. c. measured on a Scott viscosimeter at 90° C.). Below this viscosity, there is a tendency of the solution to "strike through" or penetrate the sheet that is coated therewith, or if the composition is used for the formation of self sustaining sheets or films, below 8000 secs., it will not have enough tensile strength and will be too brittle at relatively low temperatures.

In order to obtain a viscosity of 8000 secs. or over, varying proportions of the rubber ingredients in any particular wax may be used, owing to the fact that different rubber ingredients have different effects when dissolved in any particular wax upon the viscosity of the solution. For instance, if india rubber such as pale crepe or smoked sheet rubber is used with paraffin wax, about 6 to 8% of either rubber in the rubber-paraffin wax solution will give a viscosity of 8000 secs. or over, whereas to give a similar viscosity, it is necessary to use at least about 40 to 45% of refined gutta percha. To produce a viscosity of about 8000 secs., using pale crepe rubber in bleached beeswax, the percentage of rubber required is about 10 to 12%, and if using pale crepe rubber in spermaceti, the percentage of rubber must be about 16%. The product of our invention may therefore be best defined in terms of viscosity rather than in terms of any particular percentages of rubber and wax.

However, when the viscosity of a rubber-wax solution runs too high to be conveniently determined on a Scott viscosimeter, such solution may still have the desirable properties that render it useful in the formation of films or coatings or in making self sustaining, thin transparent sheets. The upper limit of viscosity has not been definitely determined but is approximately the viscosity that is obtained by the use of about 30% of pale crepe rubber in paraffin wax. Above this viscosity, the rubber-wax solution cannot be readily applied and is very difficult to handle. The composition is too viscous and too tough to render its use as an adhesive, or as a coating, satisfactory.

For the "wax" of our composition, we prefer to use a colorless, odorless and tasteless, solid paraffin hydrocarbon having a tensile strength ranging between 40 and 300 lbs. per sq. inch and a melting point of between 120 and 140° F., our preferred wax having a melting point of about 132° F. It is also possible to use candelilla, carnauba and other waxes, but the results are less satisfactory than those obtained with paraffin wax, beeswax or spermaceti.

The tensile strength of the wax or composition is determined by the following procedure: 200 c. c. of the material to be tested are melted and kept at a temperature of 212° F. for 30 minutes to drive off the moisture, after which the temperature is raised to 230° F. with constant stirring. The material is then cast, in metallic molds which have been previously immersed in water at 70° F. for 30 minutes, into bars of the shape of dumb-bells having an intermediate section ½ in. square. After cooling for two hours at 70° F., the bars of material are removed from the molds and placed in water at 70° F. for 15 minutes. The bars are then placed in a tensile strength testing device which measures the force necessary to disrupt them. To obtain the tensile strength in pounds per square inch, an average of several tests is multiplied by four, since the individual bars have a cross section of ¼ square inch.

Resinous materials may be added to our composition, with a slight advantage in sealing properties but with a greater tendency to "block". By the term "block" is meant the property possessed by sheet material when stacked to adhere together, as for instance under unusually high climatic temperature and/or humidity conditions. The use of gum rosin, for example, to replace an equal weight, up to about 15% of the paraffin can be effected without seriously increasing the blocking tendency of our composition. In general, we consider the blocking tendencies satisfactory if the sheet, film or coated sheet material when stacked, will not adhere together at temperatures below 120° F. In order to reduce the tendency of the sheets to block, they may be dusted with powdered mica.

Non-volatile liquids and greases, such as petroleum oils and petrolatum, may be included in our composition to act as plasticizers when it is desired to make masking tape and similar products. The use of volatile solvents is avoided so as to lessen the expense and to avoid the problem of eliminating the solvent to obtain a nontacky, solid product.

The "rubber" constituent of our product may be an india or gutta rubber, but preferably pale crepe or smoked sheet, especially the former, is employed. The rubber should be substantially free from color and odor and should not be a rubber that has been milled to any substantial extent.

The proportions of pale crepe rubber and paraffin wax may vary between 6 and 30% of rubber by weight of the mixture and preferably between 10 and 20%, depending upon the specific purpose for which the material is to be used. If less than 6% of rubber is used, the composition becomes brittle, particularly at low temperatures, and lacks the heat-sealing property described above. If more than 30% is used, the product is too tough to serve satisfactorily as an adhesive. However, if gutta percha is employed as the "rubber" constituent, the percentage of gutta percha must be increased considerably above 30% and to at least about 40 to 45%, since gutta percha does not increase the viscosity of the mixture to the same extent as does india rubber.

In order to fully disclose our invention, but not for purposes of limitation, we give the following preferred formula for our composition:

Percent by weight
Paraffin wax (M. pt. between 120 and 140° F.)_ 88
Rubber (pale crepe)_____ 12

The paraffin wax is melted by heating to a temperature of from 180° F. to 220° F. The rubber is then added in small pieces torn from thin sheets or in a shredded or otherwise subdivided form. The addition of the rubber reduces the temperature, which should be allowed to drop to around 180° F. and thereafter be maintained between about 160 and 180° F. until the rubber is thoroughly dissolved. It is necessary to keep the temperature of the rubber-paraffin wax mix at about the temperatures indicated in order to avoid overheating, which results in an undesirable darkening of the mass and imparts considerable odor to it.

After the rubber has been in the paraffin wax for about an hour, the pieces of rubber are sufficiently softened and swollen to permit complete disintegration by agitation. With an ordinary revolving blade stirrer, it requires 5 to 6 hours to produce a smooth solution of the rubber and paraffin wax, but with equipment specially designed for this work, the time can be materially reduced.

In compositions of our invention up to about 30% by weight of the mixture of pale crepe rubber, at which point the viscosity becomes too great, the cohesiveness of the mixture and its adhesiveness as a coating increase with the viscosity of the mixture. It is therefore important not to lower the viscosity of any given mixture unnecessarily, as by increasing the temperature or time of heating of the ingredients when dissolving the rubber in the paraffin wax. The viscosity, for a given concentration of rubber in wax, decreases with the time of heating.

As to the effect of temperature on viscosity, we have found that with a given concentration of pale crepe rubber in paraffin wax, the viscosity at a given temperature is inversely proportional to the temperature to which the mixture has been heated during or after the solution period. We have used a Scott viscosimeter test in determining viscosities and the effect of temperature thereon, with the following results:

| Temperature °F. (1 hour) | Viscosity (Scott at 90° C., 50 c. c.) |
| --- | --- |
| 150 | 12000 |
| 250 | 6500 |
| 300 | 1000 |

With a given concentration of rubber in wax, the viscosity decreases with the time of milling the rubber used in the mixture.

With a given concentration of rubber in wax very small percentages of a rubber accelerator, such as mercaptobenzothiazol, will markedly reduce the viscosity. This effect is dependent on the particular accelerator used and also upon the percentage added.

With a given concentration of rubber in wax, vulcanizing agents (such as sulphur chloride) reduce the viscosity.

With a given concentration of rubber in wax, the addition of anti-oxidants, such as symmetrical dibeta-naphthyl-p-phenylene diamine, has little or no effect on the viscosity.

Additional viscosity may be obtained in a paraffin wax mixture by the use of other materials than rubber, such as aluminum stearate, but the resultant mixture does not have so good adhesiveness nor moistureproofness as does a rubber-paraffin wax mixture of equal viscosity.

Penetrability of a pale crepe rubber-paraffin wax mixture into a sheet of paper and the like, is inversely proportional to the viscosity. In general we find that cohesiveness and adhesiveness increase rapidly with viscosity up to 10,000 secs. (Scott); and from there on at a lesser rate.

The preferred composition for adhesive coating purposes is one having sufficient viscosity to give good adhesion and to prevent penetration into the sheet, film or web material being coated or sealed, yet not so high a viscosity as to render it difficult to apply the composition.

When our product is applied to paper or fabric material, it forms a thin, flexible, non-tacky, water-, moisture-, and gasproof coating and is adapted to numerous uses. Paper so coated may be sealed to a paper or other suitable surface by merely applying heat and pressure, the resulting seal being moisture-, water- and gasproof and so adherent that the paper may generally be torn away without separating at the seal. In addition to this, our product has the advantage that it does not soak through the paper when the seal is made so that there is no "striking through" or oiled effect on the outside surface of either the coated or unprepared paper after the seal has been made.

Our composition may be made in the form of a self-sustaining sheet or film if desired, by rolling between rollers or extruding through a narrow slit or die orifice. The resulting sheet will have the sealing qualities described above, and may be used as a heat sealing tape or for other purposes.

The minimum heat and time required to make a suitable heat seal with our composition will vary slightly with the composition of the mixture. If it contains, for example, 12% of pale crepe rubber, it will seal in not over 3 seconds, at a temperature of 300° F. to 500° F., depending upon the thickness of the paper to which the seal is being made. We have found that satisfactory seals may be made at temperatures ranging from 200 to 500° F.

Where it is desired to incorporate pigments into the composition of our invention, the desired pigment may first be incorporated into the rubber in any conventional manner and subsequently the rubber dissolved in wax in the same way as described above. Pigments such as zinc oxide, barium sulfate, or any others may be employed and will remain permanently in suspension in the final composition. The composition may then be used as a coating for sheet of web material or for the other purposes mentioned above.

The term "rubber" as used in the appended claims is intended to include the use of india rubber or Hevea rubber, gutta rubber, and their natural or synthetic equivalents for the purpose of this invention, singly or mixtures thereof.

The term "india-rubber" as used in the claims is intended to include Hevea rubber, pale crepe rubber, smoke sheet rubber and other rubbers of this type, or mixtures thereof.

The term "wax" as used in the appended claims is intended to include the use of paraffin wax, beeswax, spermaceti, candelilla, carnauba and their natural or synthetic equivalents, or mixtures thereof, suitable for the purpose of this invention.

We are aware that changes may be made and many details of our invention may be varied through a wide range without departing from the essential principles thereof, and we therefore do not purpose limiting the patent granted hereon otherwise than is necessitated by the prior art.

We claim as follows:

1. A heat sealing composition comprising 70 to 94% of paraffin wax having a tensile strength of from 40 to 300 lbs. per sq. inch and a melting point of from 120 to 140° F., 6 to 30% of pale crepe rubber, said composition having imparted thereto a viscosity of at least 8000 secs. (Scott) by control of temperature and time of agitation during compounding and being adapted to form moistureproof, waterproof, non-tacky, elastic and flexible films which remain flexible at low temperatures.

2. A process for producing a heat-sealing composition, which comprises heating a wax to a temperature ranging from 180° to 220° F., dissolving a rubber therein in proportions sufficient to produce a viscosity of at least 8000 secs. (Scott), maintaining the temperature of the mass at between about 160 and 180° F. until the rubber is dissolved and cooling said mass before the viscosity has been reduced 8000 secs. (Scott).

3. A process of making a heat sealing composition, which comprises dissolving from 6 to 30% by weight of the final solution of pale crepe rubber in paraffin wax at a temperature not over 220° F. and in a minimum length of time while at such elevated temperature to prevent substantially lowering of the viscosity of the resulting solution and cooling to obtain a composition having a viscosity of at least 8000 secs. (Scott).

4. A process of making a heat sealing composition which comprises adding pale crepe rubber to molten paraffin wax in the proportions of between 6 and 30% of rubber by weight of the mixture and heating the mixture at a temperature between about 160 and 180° F. with agitation to completely dissolve the rubber in the paraffin wax as quickly as possible and cooling said mixture to obtain a composition having a viscosity of at least 8000 secs. (Scott).

5. The method of preparing a thermoplastic composition, which comprises dissolving together from 6 to 30% by weight of india rubber and from 94 to 70% by weight of paraffin wax at such temperature and within such length of time as to produce a solution having a viscosity of at least 8000 secs. (Scott) and cooling said solution before the viscosity thereof has been reduced below 8000 secs. (Scott).

6. A thermoplastic composition comprising a homogeneous solution of 6 to 30% of india rubber and 94 to 70% of paraffin wax by weight having a viscosity of at least 8000 secs. (Scott), when produced by the method described in claim 5.

7. A composition for forming flexible sheets, films or coatings which comprises a homogeneous mixture of paraffin wax and pale crepe rubber in such proportions and so compounded as to produce a mixture having sufficient cohesiveness to produce flexible, self-sustaining sheets, films, or coatings, said mixture having a viscosity of at least 8000 secs. (Scott viscosimeter at 90° C.).

8. A heat sealing composition in the form of a flexible self-sustaining sheet or film generated from a composition comprising a mixture of paraffin wax and from 6 to 30% of india rubber by weight of the mixture, said mixture being compounded under controlled temperature and time of agitation, so as to have a viscosity of at least 8000 secs. (Scott viscosimeter at 90° C.).

9. A composition adapted for use in the manufacture of masking tape, which comprises a compounded mixture of wax, a non-volitile oil and rubber, the viscosity of said mixture being at least 8000 secs. (Scott viscosimeter at 90° C.) as a result of compounding under controlled temperature and time of agitation.

10. A composition adapted for use in the manufacture of masking tape which comprises a solution of paraffin wax, a petrolatum and from 10 to 20% of pale crepe rubber, the viscosity of said solution being at least 8000 secs. (Scott viscosimeter at 90° C.), as a result of compounding under controlled temperature and time of agitation.

11. A composition for forming flexible sheets, films or coatings, which consists essentially of a mixture of a wax and from 6 to 30% of india rubber by weight of the mixture, compounded so as to produce a mixture having sufficient cohesiveness to produce flexible, self-sustaining sheets, films or coatings, said mixture having a viscosity of at least 8000 secs. (Scott viscosimeter at 90° C.).

12. A heat sealing composition in the form of a flexible self-sustaining sheet or film, generated from a composition comprising a mixture of a wax and from 6 to 30% of india rubber by weight of the mixture, said mixture being compounded under controlled temperature and time of agitation, so as to have a viscosity of at least 8000 secs. (Scott viscosimeter at 90° C.).

13. A process of imparting a viscosity of at least 8000 secs. (Scott viscosimeter at 90° C.) to a composition containing rubber and wax which comprises the steps of adding rubber to molten wax in suitable proportions, and controlling the time, temperature and agitation during the compounding of said ingredients so as to produce the desired viscosity.

14. The method of preparing a thermoplastic composition, which comprises preparing a molten wax bath, adding thereto thin sheets of rubber so as to wet all the surfaces thereof, soaking the added rubber in said wax bath a sufficient time so as to soften and swell said rubber, and mechanically stirring said mixture for a sufficient length of time and at such temperature as to produce a smooth uniform composition having a viscosity of at least 8000 secs. (Scott viscosimeter at 90° C.).

15. The method of preparing a thermoplastic composition which comprises from about 6 to 30% india rubber and from about 94 to 70% paraffin-wax, the steps of preparing a molten paraffin-wax bath heated to a temperature of about 180 to 220° F., immersing therein thin india rubber sheets in such manner as to wet all surfaces thereof, permitting the temperature of the bath to drop to 160–180° F. and thereafter maintaining said temperature, soaking the added rubber in said paraffin-wax-bath a sufficient time so as to soften and swell said rubber, and then mechanically stirring said mixture for a sufficient length of time to produce a uniform composition having a viscosity of at least 8000 secs. (Scott viscosimeter at 90° C.).

16. A relatively thin, flexible, self-sustaining film comprising a homogeneous mixture of rubber and wax, said mixture having an initial viscosity of at least 8000 secs. (Scott viscosimeter at 90° C.).

17. A relatively thin, flexible, heat sealing and self-sustaining film, comprising a hardened solution of pale crepe rubber and paraffin-wax, having an initial viscosity of at least 8000 secs. (Scott viscosimeter at 90° C.).

18. A relatively thin, flexible, heat sealing and self-sustaining film, comprising a hardened solution of pale crepe rubber and paraffin-wax within the range of 6 to 30% pale crepe rubber and 94% to 70% paraffin-wax by weight, having an initial viscosity of 8000 secs. (Scott viscosimeter at 90° C.).

19. A relatively thin, flexible, heat sealing and self-sustaining film suitable for use as a wrapper, comprising a hardened solution of from about 10 to 20% of pale crepe rubber and from 90 to 80% of paraffin-wax, the solution having a viscosity of at least 8000 secs. (Scott viscosimeter at 90° C.).

20. A relatively thin, flexible, heat sealing and self-sustaining film formed from a composition comprising a homogeneous mixture of rubber, wax and a pigment, having a viscosity of at least 8000 secs. (Scott viscosimeter at 90° C.).

21. A relatively thin, flexible, heat sealing and self-sustaining film formed from a composition comprising a homogeneous mixture of rubber, wax and a suitable age resistor having a viscosity of at least 8000 secs. (Scott viscosimeter at 90° C.).

22. A flexible self-sustaining sheet or film, generated from a composition comprising a mixture of wax and at least 40% gutta percha, said mixture being compounded under controlled temperature and time of agitation so as to have a viscosity of at least 8000 secs. (Scott viscosimeter at 90° C.).

ALLEN ABRAMS.
CHARLEY L. WAGNER.

DISCLAIMER 2,054,112.—*Allen Abrams* and *Charley L. Wagner*, Wausau, Wis. SHEET OR FILM FORMING, OR COATING COMPOSITION AND A METHOD OF PREPARING THE SAME. Patent dated September 15, 1936. Disclaimer filed February 7, 1938, by the assignee, *Marathon Paper Mills Company*.

Hereby disclaims from the scope of claim 1 of said patent any composition except such as are compounded while at a controlled temperature above the melting point of the wax and have the viscosity set forth in said claim as a property of said composition as it is initially compounded and used;

And hereby disclaims from the scope of claims 7 and 11 of said patent any composition or mixture except such as are compounded while at temperatures above the melting point of the wax and have the viscosity as set forth in the said claims as a property of said composition or mixture as it is initially compounded and used;

And hereby disclaims from the scope of claims 9 and 10 of said patent any compounded mixture or solution except such as are compounded while at controlled temperatures above the melting point of the wax and have the viscosity as set forth in said claims as a property of said mixture as it is initially compounded and used.

[*Official Gazette March 1, 1938.*]

and a suitable age resistor having a viscosity of at least 8000 secs. (Scott viscosimeter at 90° C.).

22. A flexible self-sustaining sheet or film, generated from a composition comprising a mixture of wax and at least 40% gutta percha, said mixture being compounded under controlled temperature and time of agitation so as to have a viscosity of at least 8000 secs. (Scott viscosimeter at 90° C.).

ALLEN ABRAMS.
CHARLEY L. WAGNER.

DISCLAIMER 2,054,112.—*Allen Abrams* and *Charley L. Wagner*, Wausau, Wis. SHEET OR FILM FORMING, OR COATING COMPOSITION AND A METHOD OF PREPARING THE SAME. Patent dated September 15, 1936. Disclaimer filed February 7, 1938, by the assignee, *Marathon Paper Mills Company*.

Hereby disclaims from the scope of claim 1 of said patent any composition except such as are compounded while at a controlled temperature above the melting point of the wax and have the viscosity set forth in said claim as a property of said composition as it is initially compounded and used;

And hereby disclaims from the scope of claims 7 and 11 of said patent any composition or mixture except such as are compounded while at temperatures above the melting point of the wax and have the viscosity as set forth in the said claims as a property of said composition or mixture as it is initially compounded and used;

And hereby disclaims from the scope of claims 9 and 10 of said patent any compounded mixture or solution except such as are compounded while at controlled temperatures above the melting point of the wax and have the viscosity as set forth in said claims as a property of said mixture as it is initially compounded and used.

[*Official Gazette March 1, 1938.*]

DISCLAIMER 2,054,112.—*Allen Abrams* and *Charley L. Wagner*, Wausau, Wis. SHEET OR FILM FORMING, OR COATING COMPOSITION AND A METHOD OF PREPARING THE SAME. Patent dated September 15, 1936. Disclaimer filed February 7, 1938, by the assignee, *Marathon Paper Mills Company*.

Hereby disclaims from the scope of claim 1 of said patent any composition except such as are compounded while at a controlled temperature above the melting point of the wax and have the viscosity set forth in said claim as a property of said composition as it is initially compounded and used;

And hereby disclaims from the scope of claims 7 and 11 of said patent any composition or mixture except such as are compounded while at temperatures above the melting point of the wax and have the viscosity as set forth in the said claims as a property of said composition or mixture as it is initially compounded and used;

And hereby disclaims from the scope of claims 9 and 10 of said patent any compounded mixture or solution except such as are compounded while at controlled temperatures above the melting point of the wax and have the viscosity as set forth in said claims as a property of said mixture as it is initially compounded and used.

[*Official Gazette March 1, 1938.*]